(12) United States Patent
Harris

(10) Patent No.: US 6,325,233 B1
(45) Date of Patent: Dec. 4, 2001

(54) QUICK-ON TORQUE-OVERRIDE FILLER NECK CAP

(75) Inventor: Robert S. Harris, Connersville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 09/762,898

(22) PCT Filed: Oct. 6, 1999

(86) PCT No.: PCT/US99/23127

§ 371 Date: Feb. 14, 2001

§ 102(e) Date: Feb. 14, 2001

(87) PCT Pub. No.: WO00/20292

PCT Pub. Date: Apr. 13, 2000

Related U.S. Application Data

(60) Provisional application No. 60/103,259, filed on Oct. 6, 1998.

(51) Int. Cl.[7] .................................................. B65D 41/04
(52) U.S. Cl. ................... 220/288; 220/304; 220/DIG. 33
(58) Field of Search ................................ 220/288, 304, 220/DIG. 33, 255, 297, 300, 86.2

(56) References Cited

U.S. PATENT DOCUMENTS

| 3,667,642 | 6/1972 | Blau et al. . |
|---|---|---|
| 4,000,633 | 1/1977 | Evans . |
| 4,712,703 | 12/1987 | Oddenino . |
| 5,108,001 | 4/1992 | Harris . |
| 5,110,003 | 5/1992 | MacWilliams . |
| 5,361,924 | 11/1994 | Muller . |
| 5,638,975 | 6/1997 | Harris . |
| 5,794,806 | 8/1998 | Harris et al. . |

Primary Examiner—Nathan J. Newhouse
(74) Attorney, Agent, or Firm—Barnes & Thornburg

(57) ABSTRACT

A cap (10) includes a handle (12), torque-transmission ring (16), a driver (14) coupled to handle (10) and ring (16), and a closure member (20) adapted to close a tank filler neck (42). A connector (18) couples ring (16) to closure member (20) to establish a torque-limited connection (26) during cap installation and a direct-drive connection (28) during cap removal. An axial spring (22) coupled to handle (12) and ring (16) yieldably biases ring (16) toward closure member (20) to maintain the torque-limited connection (26). A rotary spring (24) coupled to handle (12) and ring (16) rotates closure member (20) relative to handle (12) to a reset position upon removal of cap (10) from filler neck (42).

40 Claims, 9 Drawing Sheets

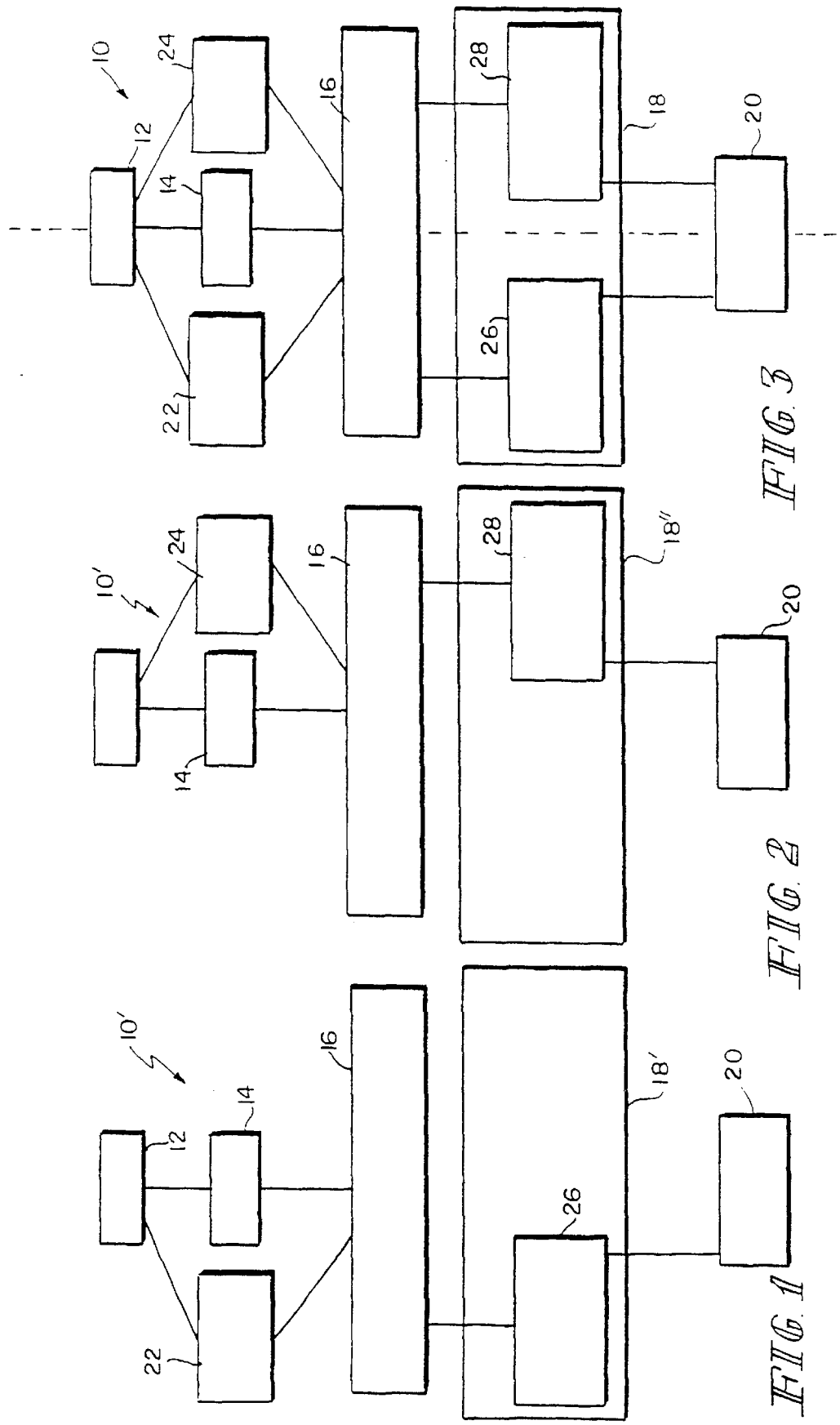

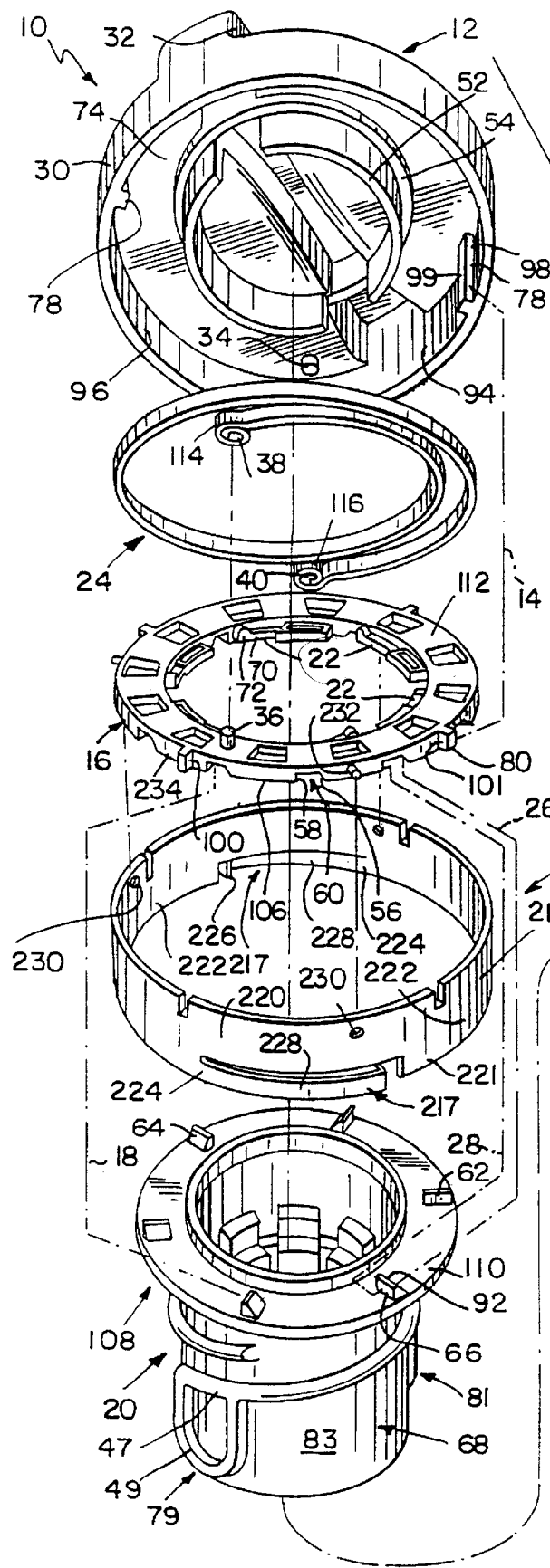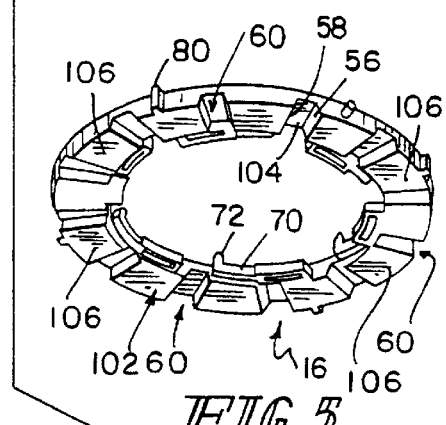

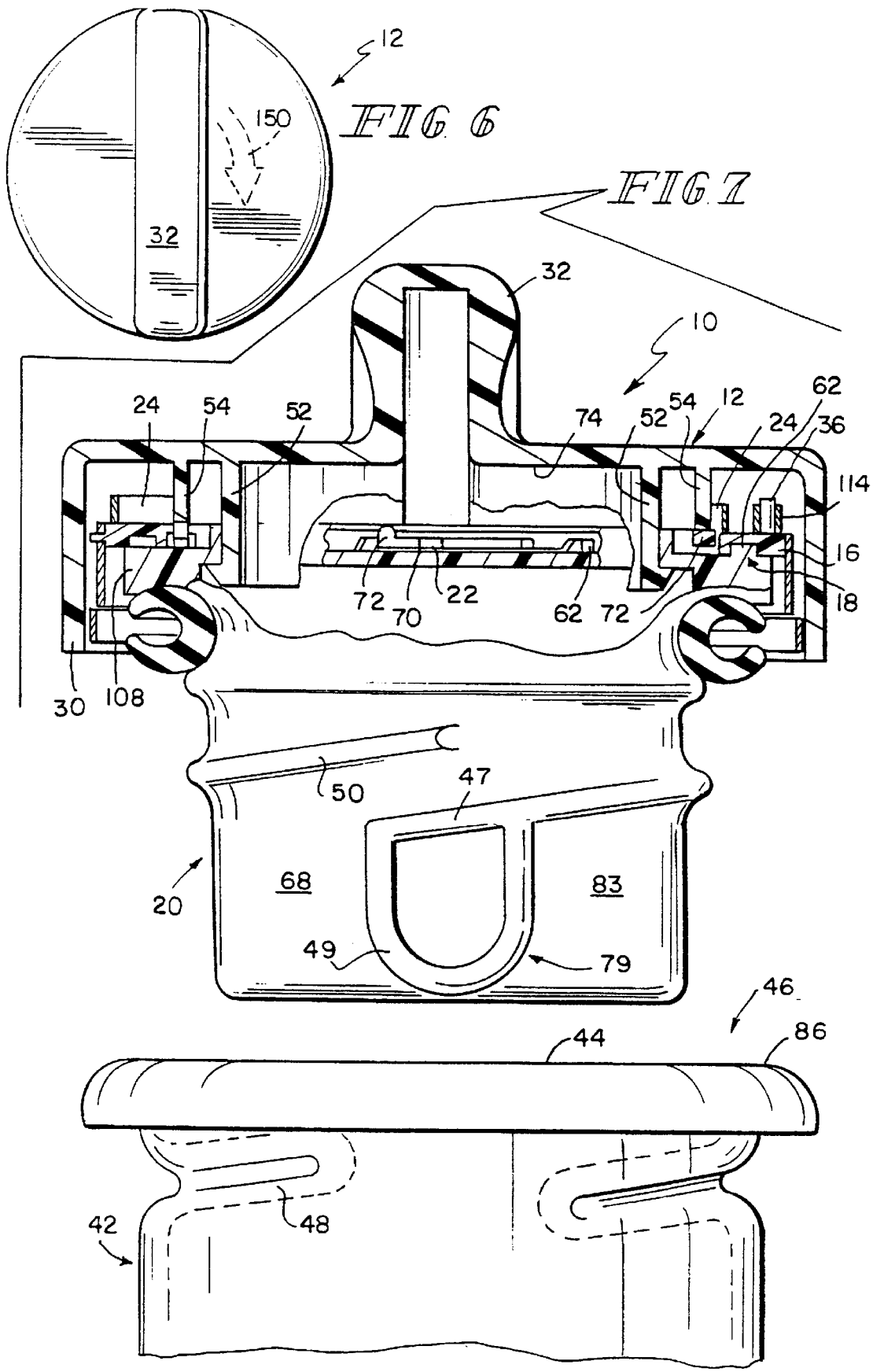

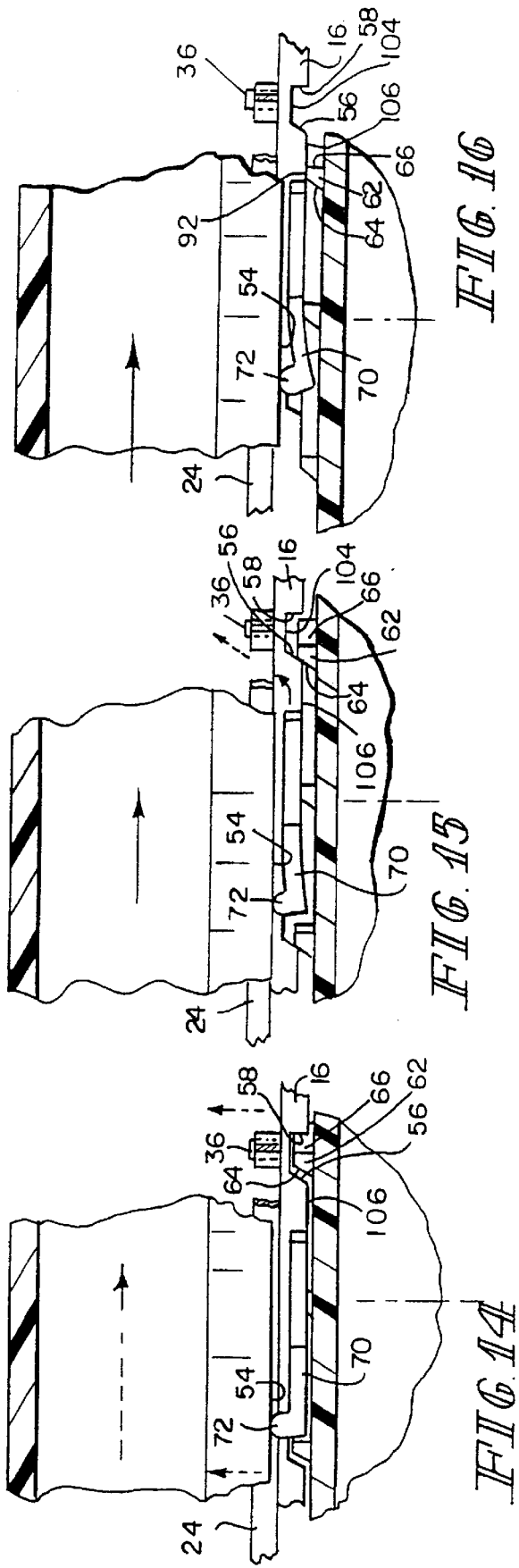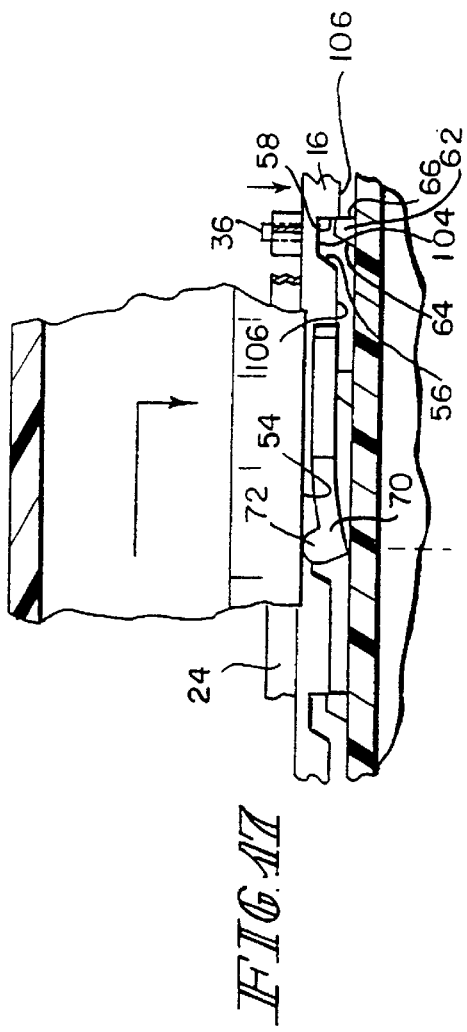

QUICK-ON TORQUE-OVERRIDE FILLER NECK CAP

This application claims priority to U.S. Provisional Application No. 60/103,259 filed Oct. 6, 1998.

BACKGROUND AND SUMMARY OF THE INVENTION

The present invention relates to a cap for closing the mouth of a vehicle fuel tank filler neck, and particularly to a tank filler neck closure cap designed to withstand the application of excessive closure torque and to reset automatically to an installation configuration upon removal from the filler neck. More particularly, the present invention relates to a quick-on filler neck closure cap having a torque-control mechanism that is operative during cap installation and a spring-driven closure member reset mechanism that is operative during cap removal.

Conventional caps for closing the filler neck of a vehicle fuel tank typically include a closure member carrying a seal for closing and sealing the mouth of the filler neck and a handle for turning the closure member to mount the closure member and seal in the filler neck. A typical filler neck cap includes a ring-shaped seal made of a resilient gasket material that is compressed between the cap and a filler neck receiving the cap to establish a sealed connection between the cap and the filler neck when the cap is mounted on the filler neck.

Frequent over-tightening of a filler neck fuel cap can crush or otherwise damage the O-ring gasket which provides the seal between the cap and the filler neck. The torque-control mechanism was developed to limit the amount of torque which could be applied by a user in the cap-advancing direction as the user rotates the cap on the filler neck to its fully seated filler neck-closing position thereon. Thus, a torque-control mechanism helps minimize wear and tear on the O-ring gasket and preserves the sealing capability of the gasket. See, for example, U.S. Pat. Nos. 4,913,303 to Harris and 5,110,003 to MacWilliams, the disclosures of which are incorporated by reference herein.

More and more vehicle drivers are using the self-service bays at gasoline stations and filling their own fuel tanks. Some people have found that it is difficult to remove and install a conventional filler neck cap during refueling. A quick-on cap that is readily installable on and removable from a filler neck by a user without a lot of effort and that is configured to establish a sturdy sealed connection between the cap and the filler neck consistently during use would be welcomed by users of such caps.

Many quick-on filler neck caps are configured to be engaged with internal flanges formed in the filler neck to cause the cap to be retained quickly and easily in the filler neck after being rotated, for example, one-eighth or one-quarter of a turn in the filler neck. Quick-on caps are disclosed, for example, in U.S. Pat. Nos. 5,395,004 to Griffin and Harris; 5,381,919 to Griffin and Harris; 5,480,055 to Harris and Griffin; and 5,794,806 to Griffin and Harris; and in U.S. application Ser. No. 09/254,516 to Griffin, filed on Mar. 9, 1999, the disclosures of which are incorporated by reference herein.

According to the present invention, a filler neck cap includes a closure member adapted to close a filler neck, a handle, and a torque-transmission ring positioned to lie between the handle and the closure member and coupled to the handle to rotate therewith. A connector is positioned to lie between the torque-transmission ring and the closure member. The connector is configured to provide a torque-limited connection between the ring and the closure member during rotation of the handle and the ring in a cap-advancing direction and to provide a direct-drive connection between the ring and the closure member during rotation of the handle and the ring in a cap-removal direction.

An axial spring is provided to yieldably urge the torque-transmission ring in a direction toward the closure member during rotation of the handle and the ring about an axis with and relative to the closure member to maintain the torque-limited connection. The axial spring is positioned to extend between the torque-transmission ring and the handle.

In preferred embodiments, the axial spring includes several spring arms and each spring arm includes a fixed end coupled to an annular inner edge of the torque-transmission ring and a free end arranged to engage and ride on a foundation wall provided on the underside of the handle and arranged to face downwardly toward the underlying torque-transmission ring. The spring arms are made of a spring material and act to "push" the torque-transmission ring downwardly toward the closure member to maintain the torque-limited connection during cap installation in a filler neck whether the handle and torque-transmission ring are cooperating to turn the closure member in the filler neck to assume an installed position therein or whether the handle and torque-transmission ring are rotating together as a unit relative to the closure member after the closure member has been installed in the filler neck during a torque-override condition wherein drive teeth on the ring ramp on and over underlying driven teeth on the closure member to create the familiar "clicking" sound vehicle refuelers associate with the torque-override function of a vehicle fuel cap.

A rotary spring is coupled to the handle and to the torque-transmission ring and arranged to cause the closure member to rotate relative to the handle automatically upon removal of the cap from the filler neck prior to refueling. The cap is configured to provide a lost-motion driving connection during cap removal so that the handle always rotates through a lost-motion angle during initial rotation of the handle about an axis relative to the filler neck in a cap-removal direction. Upon removal of the cap from a filler neck, while the user is still gripping the cap by holding onto the handle, the rotary spring inside the cap functions to rotate the torque-transmission ring and the closure member, which is coupled to the torque-transmission ring by a direct-drive connection established during cap removal, relative to the handle to cause the closure member to be rotated to a predetermined position so that the user can later positively and quickly reinstall the quick-on cap in the filler neck without experiencing any "lost motion" movement between the handle and the closure member.

In preferred embodiments, the rotary spring is a helical clock spring arranged to lie adjacent to an annular outer side wall of the handle. One end of the spring is coupled to a downwardly projecting post appended to an underside of the handle and the other end of the spring is coupled to an upwardly projecting post appended to a top surface of the torque-transmission ring. The helical clock spring is arranged to lie in a radially outward position against the annular side wall of the handle and away from the central axis of rotation to allow an open space to exist in the cup under a center portion of the handle.

In preferred embodiments, the filler neck cap further includes a conductor configured to conduct an electrical charge from the handle to the filler neck during rotation of the handle relative to the closure member and before movement of the closure member to break a seal established between the closure member and the filler neck. The conductor includes an annular band coupled to the torque-transmission ring to rotate therewith and a finger appended to the annular band. The finger is arranged to be moved by a boss on the handle to establish electrical contact between a tip of the finger and the filler neck before the closure member is moved to open the filler neck.

Additional features and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompany figures in which:

FIG. 1 is a block diagram of a filler neck cap in accordance with the present invention showing use of a spring coupled to a handle and a torque-transmission ring to urge the ring away from the handle and toward a filler neck closure member to establish and maintain a torque-limited connection between the ring and the closure member that is operative during cap installation in the filler neck;

FIG. 2 is a block diagram of a filler neck cap in accordance with the present invention showing use of a spring coupled to a handle and a torque-transmission ring to rotate a unit comprising the ring and a closure member (coupled to the ring by a direct-drive connection) about a vertical axis through the cap relative to the handle during removal of the cap from a filler neck prior to vehicle refueling to "reset" the closure member to a predetermined rotational position relative to the handle to facilitate later reinstallation of the cap in the filler neck after vehicle refueling;

FIG. 3 is a block diagram of a filler neck cap in accordance with a presently preferred embodiment of the invention showing the springs of FIGS. 1 and 2 coupled to a handle and a torque-transmission ring;

FIG. 4 is an exploded perspective view of a preferred embodiment of a quick-on, torque-override cap in accordance with the present invention and a perspective view of an outer portion of a vehicle fuel tank filler neck adapted to receive the cap in an open mouth formed therein, the cap including a handle (shown from the underside), a rotary spring made of a helically wound strip of spring metal, a torque-transmission ring underlying the rotary spring, an axial spring comprising six spring arms appended to an annular inner edge of the torque-transmission ring, an annular static electricity conductor ring, and a closure member adapted to fit into the filler neck to close the open mouth thereof;

FIG. 5 is a perspective view of the bottom of the torque-transmission ring of FIG. 4 showing the six spring arms from another vantage point;

FIG. 6 is a top plan view of the handle of the torque-override cap of FIG. 4 showing a phantom double arrow indicating the direction of rotation to install the torque-override cap into the filler neck;

FIG. 7 is a view of the torque-override cap of FIG. 4 (after assembly) prior to insertion of the cap into a mouth of the filler neck, with upper portions broken away, showing various internal components of the cap including the torque-transmission ring and spring arms coupled to the ring;

FIGS. 14–17 show operation of one of the spring arms included in the axial spring to bias the torque-transmission ring toward the closure member to maintain a torque-limited connection therebetween;

FIG. 14 is a partial sectional view similar to FIG. 9 illustrating the torque-transmission ring in its neutral position showing the spring head in direct engagement with the shell lip on the underside of the handle and the spring arm in its undeflected position;

FIG. 15 is a partial sectional view similar to FIG. 14 showing a ramp face of one groove of the torque-transmission ring beginning to ride up and over a ramp face of one lug (i.e., driven tooth) of the closure member, thereby causing the torque-transmission ring itself to ride upward and the spring arm to deflect;

FIG. 16 is a partial sectional view similar to FIG. 15 showing the ramp face of the groove of the torque-transmission ring having ridden up and over the ramp face of the lug (i.e., driven tooth) of the closure member and the skid of the torque-transmission ring now riding on a top surface of the lug with the spring head in direct engagement with the shell lip, thereby fully deflecting the spring arm;

FIG. 17 is a partial sectional view similar to FIG. 16 showing the skid of the torque-transmission ring having ridden completely over and beyond the top surface of the lug (i.e., driven tooth) of the closure member and the spring arm fully deflected with the spring head in direct contact with the shell insert, thereby causing the spring arm to urge the torque-transmission ring back to its base position with the lug riding within the groove of the torque transmission ring;

DETAILED DESCRIPTION OF THE DRAWINGS

Figure 8:
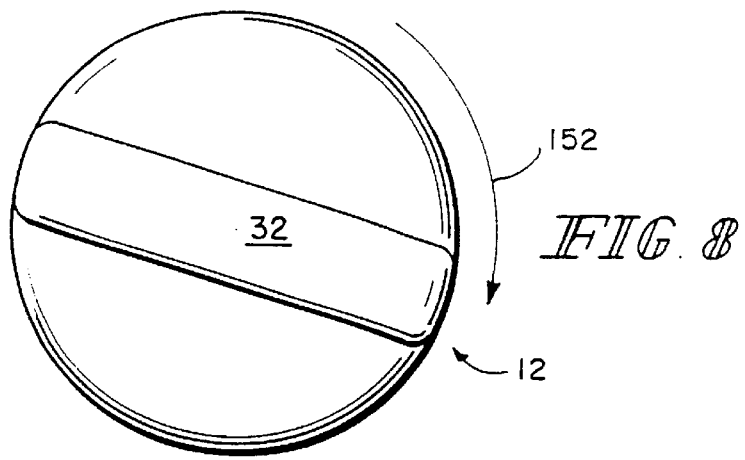
FIG. 8 is a top plan view of the handle of the torque-override cap of FIGS. 6 and 7 showing partial installation of the cap in the filler neck after rotation of the handle approximately 100 degrees in a clockwise direction from the position shown in FIGS. 6 and 7.

Filler neck caps in accordance with the present invention are shown diagrammatically in FIGS. 1–3. In each case, the cap includes a handle 12, a torque-transmission ring 16, and a closure member 20 adapted to close a vehicle fuel tank filler neck 42 of the type shown in FIG. 4. Each cap also includes a driver 14 that operates to rotate torque-transmission ring 16 about an axis in response to rotation of handle 12 about the same axis. In preferred embodiments, driver 14 is configured to provide a lost-motion driving connection between handle 12 and torque-transmission ring 16 so that initial rotation of the handle 12 in a cap-removal direction through a predetermined angle does not impart any rotational movement to torque-transmission ring 16 or closure member 20 sufficient to break a sealed connection between closure member 20 and the filler neck. Lost-motion driving connections are disclosed in U.S. Pat. Nos. 5,449,086 and 5,638,975, which disclosures are incorporated by reference herein.

As shown in FIG. 1, an axial spring 22 is provided in cap 10' to yieldably urge torque-transmission ring 16 in a direction away from handle 12 and toward closure member 20 to maintain a torque-limited connection 26 established by connector 18' between torque-transmission ring 16 and closure member 20. Torque-limited connection 26 transmits torque from torque-transmission ring 16 to closure member 20 to cause closure member 20 to turn in filler neck 42 during cap installation (in response to rotation of handle 12) until closure member 20 is installed in the filler neck and the torque applied by the torque-transition ring 16 begins to exceed a predetermined torque. Torque-limited connection 26 operates to prevent over-tightening the closure member 20 in the filler neck, which can lead to damage of an O-ring seal positioned to lie between closure member 20 and the filler neck and arranged to establish a sealed connection therebetween. In a preferred embodiment, axial spring 22 comprises a plurality of spring arms 70 (see FIG. 4) coupled at one end to torque-transmission ring 16 and provided with spring heads 72 at an opposite end, which heads 72 are arranged to maintain contact with an underside of handle 12 and "push off" from handle 12 during cap installation to maintain torque-limited connection 26.

As shown in FIG. 1, during installation, handle 12 of torque-override cap 10' drives torque-transmission ring 16 via driver 14. Simultaneously, torque-transmission ring 16 drives closure member 20 through connector 18'. The driving connection made at connector 18' is established by urging torque-transmission ring 16 down and against closure member 20. Torque transmission ring 16 is urged against closure member 20 by axial spring 22 positioned between handle 12 and torque-transmission ring 16. In this way, as handle 12 is rotated clockwise, axial spring 22 urges torque-transmission ring 16 against closure member 20, thereby causing closure member 20 to rotate with torque-transmission ring 16. However, if the torque between torque-transmission ring 16 and closure member 20 increases beyond a predetermined limit, torque-limited connection 26 of connector 18 gives way and handle 12 and torque-transmission ring 16 begin to rotate independently of closure member 20.

As shown in FIG. 2, a rotary spring 24 is provided in cap 10" to "eliminate" any lost motion that might otherwise exist between handle 12 and torque-transmission ring 16 as soon as cap 10" is removed from the filler neck at the beginning of a vehicle refueling cycle so that no "lost motion" will be present when it is time for a user to reinstall cap 10" in the filler neck at the end of the vehicle refueling cycle. Although it is desirable to provide a certain amount of lost motion between handle 12 and torque-transmission ring 16 once the cap is installed it is less desirable to require the user to rotate handle 12 relative to torque-transmission ring 16 through a lost-motion angle at the beginning of each cap installation cycle. Rotary spring 24 is coupled at one end to handle 12 and at an opposite end to torque-transmission ring 16 and configured to rotate torque-transmission ring 16 (and closure member 20 coupled to torque-transmission ring 16 by direct-drive connection 28) relative to handle 12 as soon as cap 10" is removed from the filler neck to cause closure member 20 to be rotated to a predetermined position so that the user can later positively and quickly reinstall the quick-on cap 10" in the filler neck without any lost-motion movement between handle 12 and closure member 20. In a preferred embodiment, rotary spring 24 is a helical clock spring made of a strip of spring metal and configured to be coupled at one end to handle 12 and at an opposite end to torque-transmission ring 16 as shown, for example, in FIG. 4.

As shown in FIG. 2, the structure of cap 10" includes handle 12, driver 14, torque-transmission ring 16, rotary spring 24, connector 18", closure member 20, and a direct-drive connection 28. During removal, handle 12 is rotated counterclockwise, thereby rotating torque-transmission ring 16 counterclockwise via driver 14. However, before handle 12 begins driving torque-transmission ring 16 via driver 14, rotary spring 24 is wound or loaded. In this way, during the first approximately 90 degrees of counterclockwise rotation of handle 12, torque-transmission ring 16 remains stationary and rotary spring 24 is wound or loaded. Once rotary spring 24 is loaded, driver 14 engages. Thus, further counterclockwise rotation of handle 12 rotates torque-transmission ring 16. Once this occurs, closure member 20 rotates counterclockwise via direct drive-connection 28 of connector 18" to effect removal of closure member 20 from filler neck 42.

As shown in FIG. 3, a cap 10 in accordance with a presently preferred embodiment of the invention includes axial spring 22 and rotary spring 24. An exploded perspective view of cap 10 is shown in FIG. 4 and a sequence of views illustrating installation of cap 10 in filler neck 42 are shown, for example, in FIGS. 6–13. Operation of one of the spring arms 70 included in axial spring 22 is shown in FIGS. 14–17.

As shown in FIG. 4, handle 12 includes a shell 30 having an inner shell face 74, an inner shell wall 95, a shell insert 52, and a shell lip or foundation wall 54. Two shell ribs 78 are coupled to inner shell wall 95 at opposite positions of an inner perimeter 96 of shell 30. Shell rib 78 cooperates with a ring projection 80 of torque-transmission ring 16 to form driver 14 between handle 12 and torque-transmission ring 16. A front face 98 of shell rib 78 engages a rear face 100 of ring projection 80 to drive torque-transmission ring 16 in a clockwise direction during clockwise rotation of handle 12.

In addition to ring projections 80, torque-transmission ring 16 includes grooves 60 molded into a bottom surface 102 of torque-transmission ring 16, as best shown, for example, in FIG. 5. Each groove 60 includes a ceiling 104, a ramp face 56, and a vertical face 58 as also shown in FIG. 5. Ramp faces 56 help to establish a torque-limited connection during cap installation and vertical faces help to establish a direct-drive connection during cap removal. On bottom surface 102 of torque-transmission ring 16, and between successive grooves 60, are skids 106 as shown in FIGS. 4 and 5.

A pair of position-locator lugs 79, 81 is appended to an exterior surface 83 of closure shaft 68 of closure member 20 as shown, for example, in FIG. 4. The position-locator lugs 79, 81 are arranged in spaced-apart relation to one another so that each position-locator lug will pass through one of the lug-receiving spaces 41, 43 defined by filler neck threads 48 during an initial stage of cap installation. Each position-locator lug 79, 81 includes an inclined (with respect to the horizontal) flange guide 47 and a rounded guide edge 49 depending from flange guide 47 as shown best in FIG. 4. Position-indicator lug 79 is positioned to lie about one hundred eighty degrees (180°) away from position-indicator lug 81 about the circumference of cylindrical exterior surface 83 as shown in FIG. 4. Reference is hereby made to U.S. application Ser. No. 09/254,516, filed on Mar. 9, 1999, for additional disclosure relating to the function and operation of lugs 79, 81 and flange guide 47 and filler neck threads 48, which disclosure is hereby incorporated by reference herein.

Figure 9:
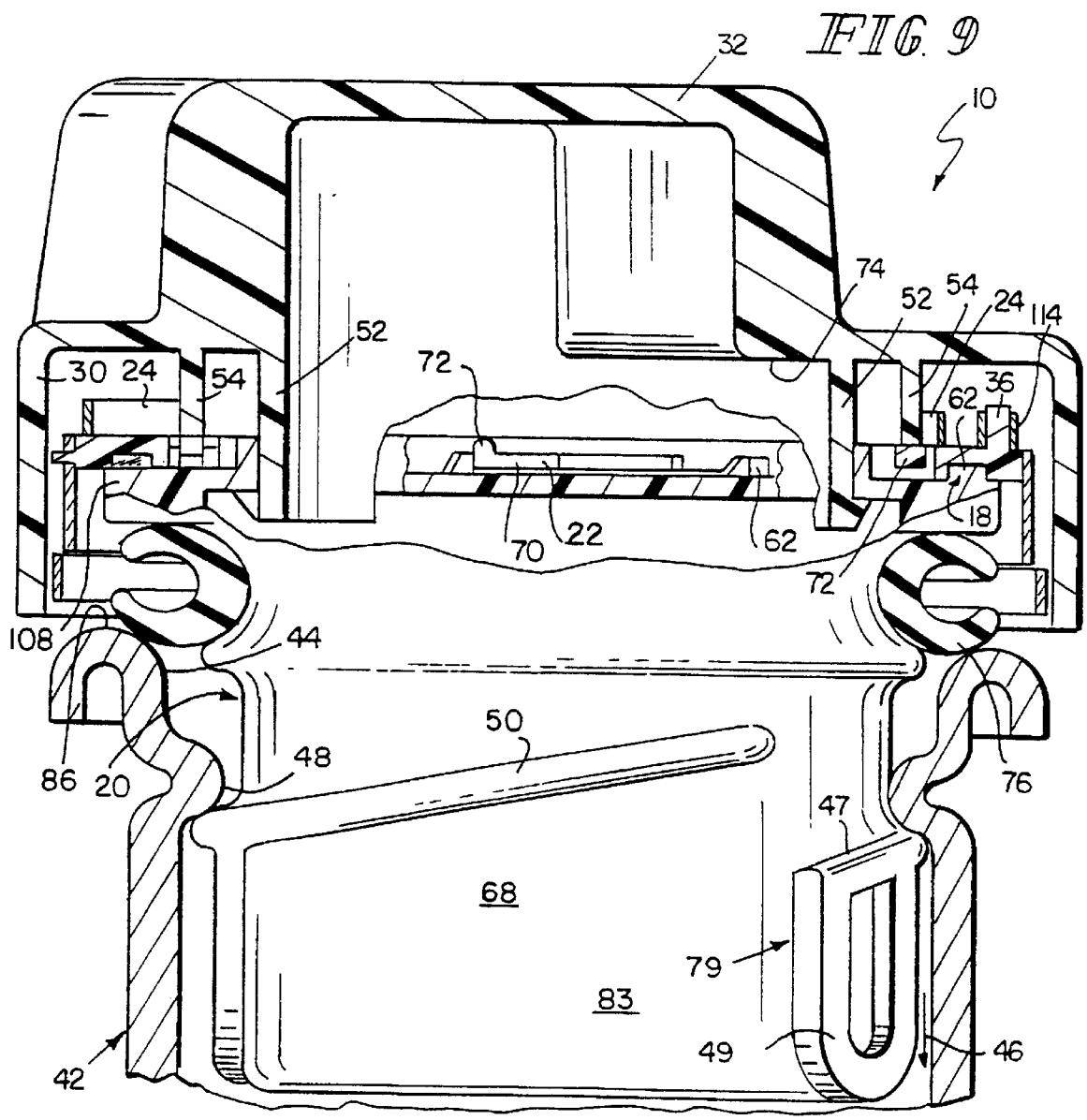
FIG. 9 is a view similar to FIG. 7 of the torque-override cap in the cap position shown in FIG. 8 after it has been inserted through the mouth of the filler neck and rotated approximately 100 degrees into the cap-receiving passageway of the filler neck.

As further shown in FIG. 4, closure member 20 includes a flange 108 having a top surface 110. Positioned around top surface 110 are multiple closure lugs or driven teeth 62 having ramp faces 64 and vertical faces 66. Torque-transmission ring 16 drives closure member 20 via a torque-limited connection 26 comprising ramp faces 56 of grooves 60 and ramp faces 64 of closure lugs 62. As best shown in FIG. 9, as torque-transmission ring 16 rotates in a clockwise direction in response to rotation of handle 12, ramp faces 56 of grooves 60 engage ramp faces 64 of closure lugs 62 to form torque-limited connection 26 therebetween. In this way, clockwise rotation of torque-transmission ring 16 imparts a clockwise rotation to closure member 20, thereby turning closure member 20 into a cap-receiving passageway 46 of filler neck 42.

As shown in FIG. 4, closure member 20 further includes a closure shaft 68 having closure threads 50 molded to it. As closure member 20 rotates clockwise into cap-receiving passageway 46 of filler neck 42, closure threads 50 engage neck threads 48 molded within filler neck 42 (see FIG. 9). As closure threads 50 tighten within neck threads 48, the torque transmitted between ramp faces 56 of grooves 60 and ramp faces 64 of closure lugs 62 increases. Once this torque reaches and exceeds a predetermined level, ramp faces 56 of grooves 60 of torque-transmission ring 16 begin to slide up ramp faces 64 of closure lugs 62 (shown in detail in FIG. 11 and FIGS. 14–16), thereby allowing handle 12 to begin to rotate independently of closure member 20.

As shown in FIGS. 6 and 7, as torque-override cap 10 is prepared to be inserted into filler neck 42 and rotated in a clockwise direction as shown by arrow 150, torque-transmission ring 16 is in its base position with ramp faces 56 of grooves 60 adjacent to ramp faces 64 of closure lugs 62 and top surfaces 92 of closure lugs 62 adjacent ceilings 104 of grooves 62. Further, a "rubber" sealing gasket 76 is in its undeformed position.

Then, as depicted in FIGS. 8 and 9, with closure shaft 68 inserted into cap-receiving passageway 46 of filler neck 42, handle 12 is turned approximately 100 degrees in a clockwise direction as shown by arrow 152. By turning handle 12 in clockwise direction 152, closure member 20 moves down into cap-receiving passageway 46 of filler neck 42 through the cooperation of closure threads 50 and neck threads 48.

Figure 10:
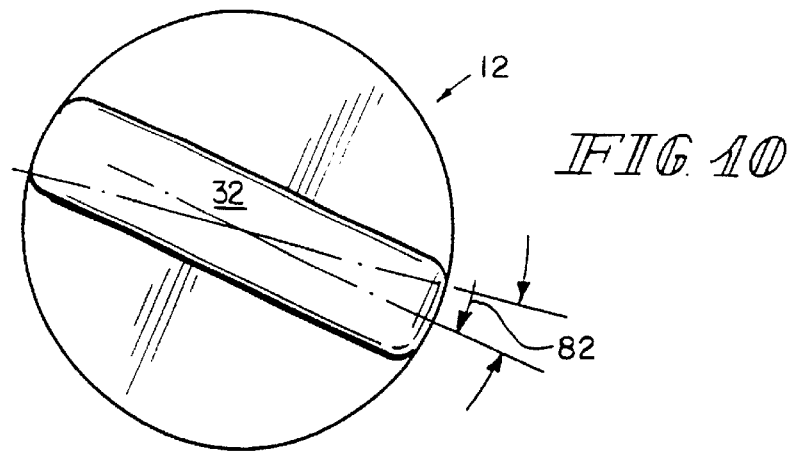
FIG. 10 is a top plan view of the handle of the torque-override cap showing the position of the handle after it has been rotated further in a clockwise direction through an angle of approximately 10 degrees in addition to the 100 degrees of rotation depicted in FIG. 8.
Figure 11:
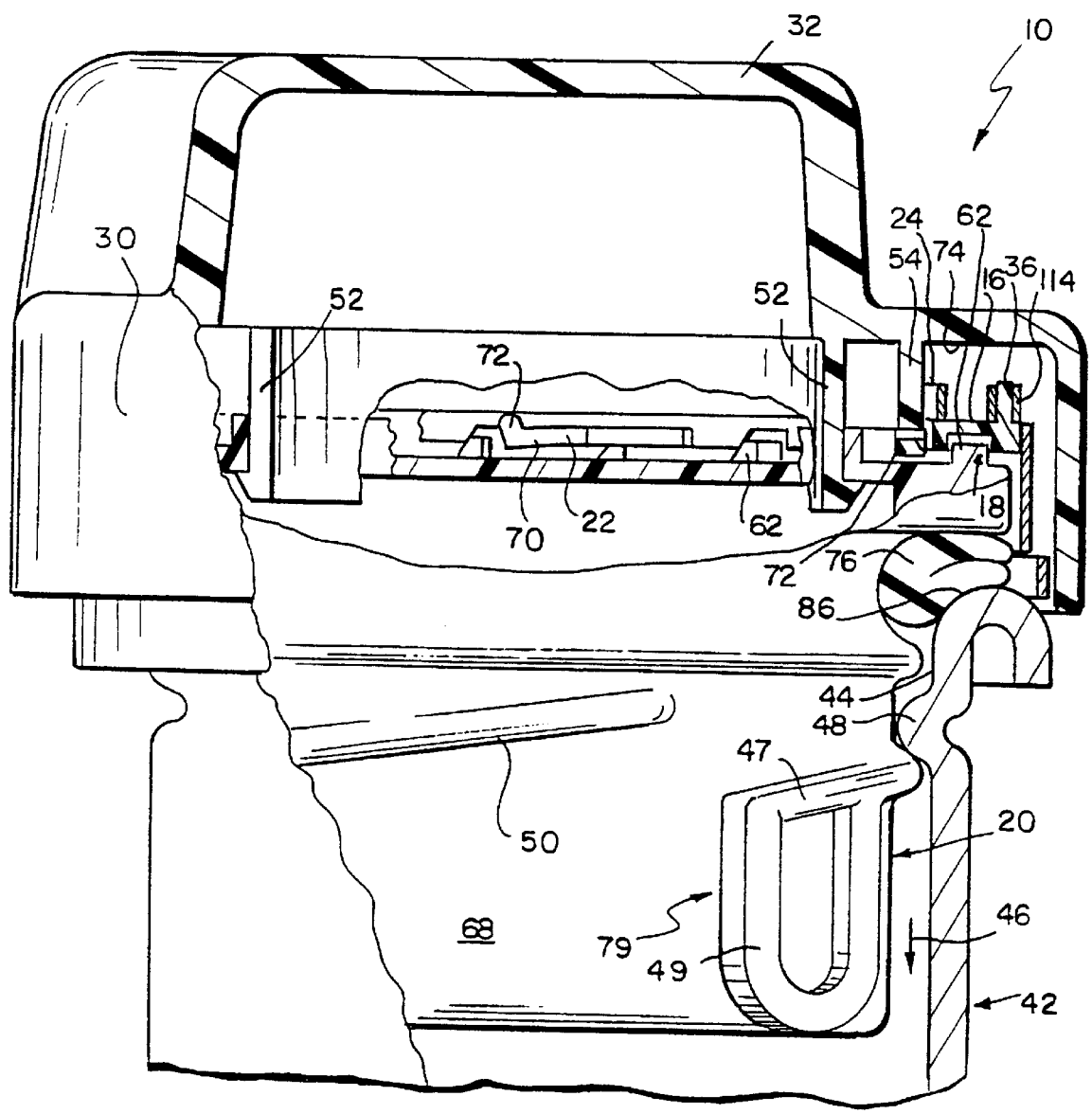
FIG. 11 is a view of the torque-override cap of FIG. 10, with portions broken away, showing deformation of an O-ring sealing gasket located between the closure member and a lip of the filler neck and movement of the spring-biased torque-transmission ring to ride up and over driven teeth on the closure member during a torque-override condition.

As best seen in FIGS. 10 and 11, after handle 12 has been rotated approximately 100 degrees clockwise, closure threads 50 begin to be wedged within neck threads 48. At this point, the force of closure threads 50 being wedged within neck threads 48 overcomes the driving force between ramp faces 56 of grooves 60 and ramp faces 64 of closure lugs 62. Thus, ramp faces 56 begin to ride up ramp faces 64 as handle 12 is further rotated through an angle 82 as shown in FIG. 10. Simultaneously, as spring heads 72 ride in continuous contact with shell lip 54 spring arms 70 urge torque-transmission ring 16 down against closure lugs 62. Finally, FIG. 11 illustrates that, as handle 12 is rotated through angle 82, sealing gasket 76 deforms to fully seal mouth 44 of filler neck 42.

Figure 12:
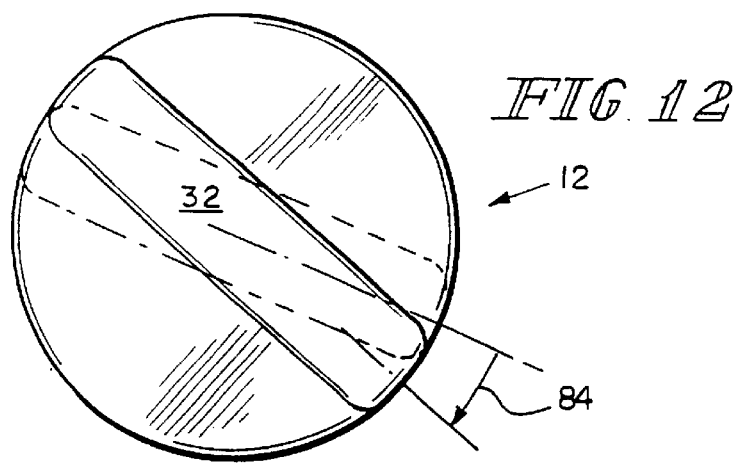
FIG. 12 is a top plan view of the handle of the torque-override cap showing the position of the handle after the handle has been rotated clockwise through an angle in addition to the rotation depicted in FIG. 10.
Figure 13:
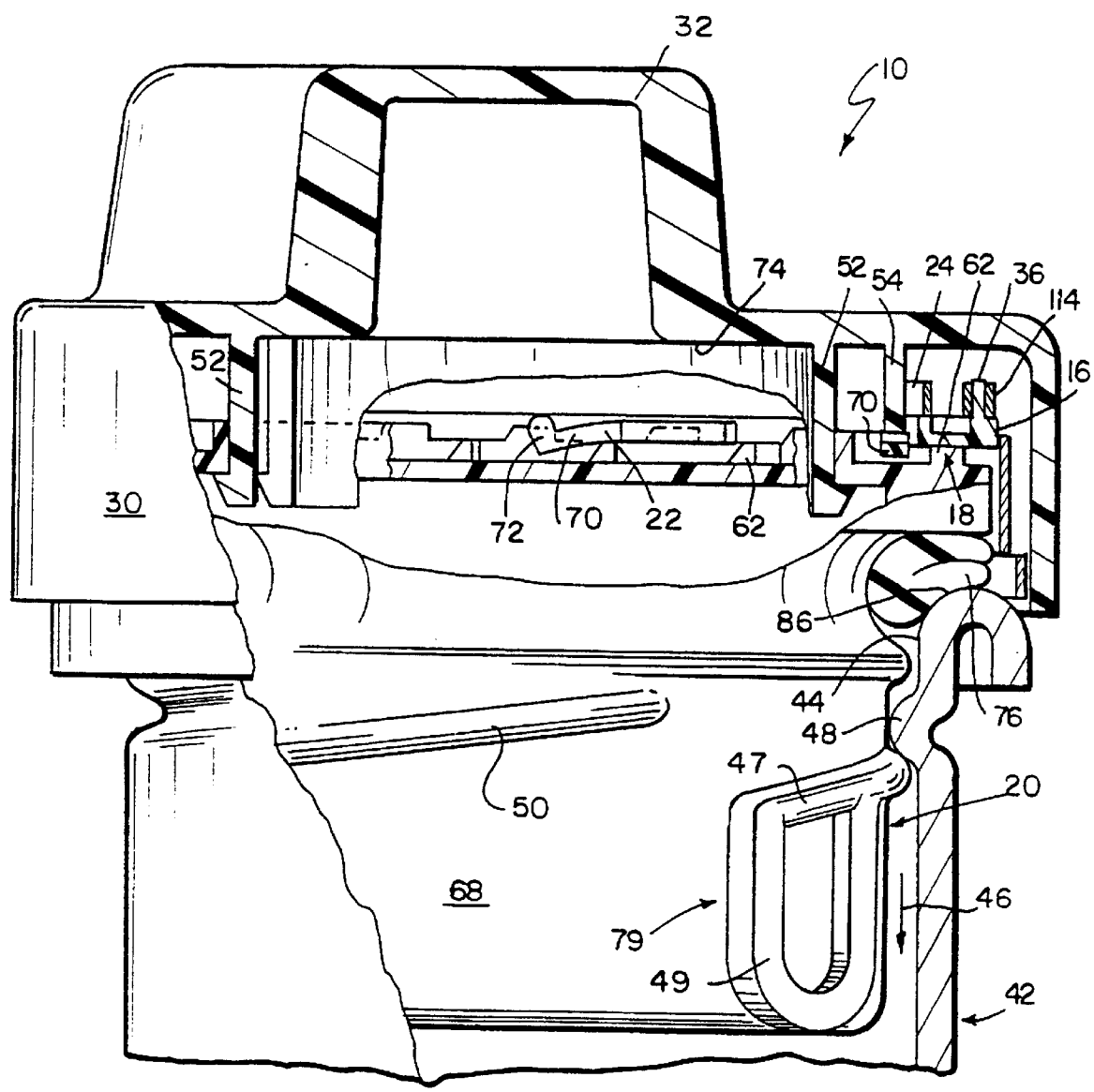
FIG. 13 is a view of the torque-override cap of FIG. 12, with portions broken away, showing a skid between successive grooves in the torque-transmission ring to ride up onto the top surface of the lug of the closure member, thereby deflecting a spring arm of the axial spring as a spring head continues to ride in direct contact with a shell lip of the handle.
Figure 18:
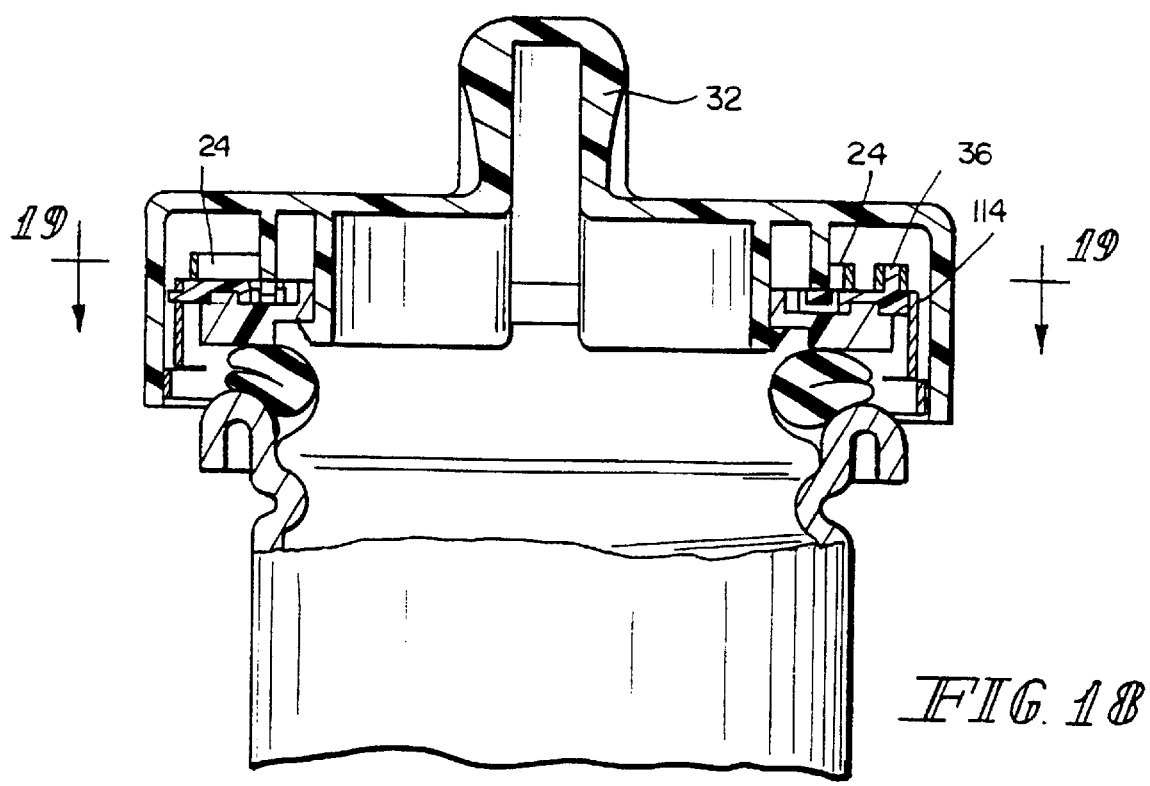
FIG. 18 is a sectional view of the torque-override cap inserted through the mouth of the filler neck and rotated to its fully sealed position.

Still further rotation of handle 12 through an angle 84 as shown in FIG. 12 drives torque-transmission ring 16 causing ramp faces 56 of grooves 60 to ride completely up and over ramp face 64 of closure lugs 62 (see FIG. 13). As shown in FIGS. 12 and 13, rotation of handle 12 through angle 84 causes torque-transmission ring 16 to ride on top of closure lug 62 with skids 106 of bottom surface 102 of torque-transmission ring 16 sliding along top surfaces 92 of closure lugs 62. Again, with spring heads 72 continuing to ride in constant contact with shell lip 54, spring arms 70 cause torque-transmission ring 16, and therefore skids 106, to be urged down and against top surfaces 92 of closure lugs 62.

The interaction of torque-transmission ring 16 and closure lugs 62 during the entire installation sequence can been seen in detail in FIGS. 14 through 17. There, ramp faces 56 of grooves 60 begin to ride up ramp faces 66 of closure lugs 62 (FIG. 14). Once ramp faces 56 have ridden part way up ramp faces 64, spring arms 70 begin to deflect as entire torque-transmission ring 16 rides upward around shell lip 54, but spring heads 72 ride in constant contact with shell lip 54 (FIG. 15). Upon further clockwise rotation of handle 12, ramp faces 56 ride completely up and over ramp faces 64 and skids 106 slide along top surfaces 92 of closure lugs 62 (FIG. 16). Once skids 106 have cleared top surfaces 92 of closure lugs 62, spring arms 70 urge torque-transmission ring 16 back downward against top surface 110 of closure member 20 (FIG. 17). Thus, top surfaces 92 of closure lug 62 reposition themselves adjacent to ceilings 104 of grooves 60 (FIG. 17 and FIG. 14). Handle 12 can then continue to be rotated so that the next sequential ramp face 56 begins to ride up and over ramp face 64 of closure lug 62. In this way, handle 12 can continue to be rotated through the sequence shown in FIGS. 14 through 17 without further rotation of closure member 20. This torque-limiting feature thereby limits the amount of wear and tear placed on sealing gasket 76.

Figure 19:
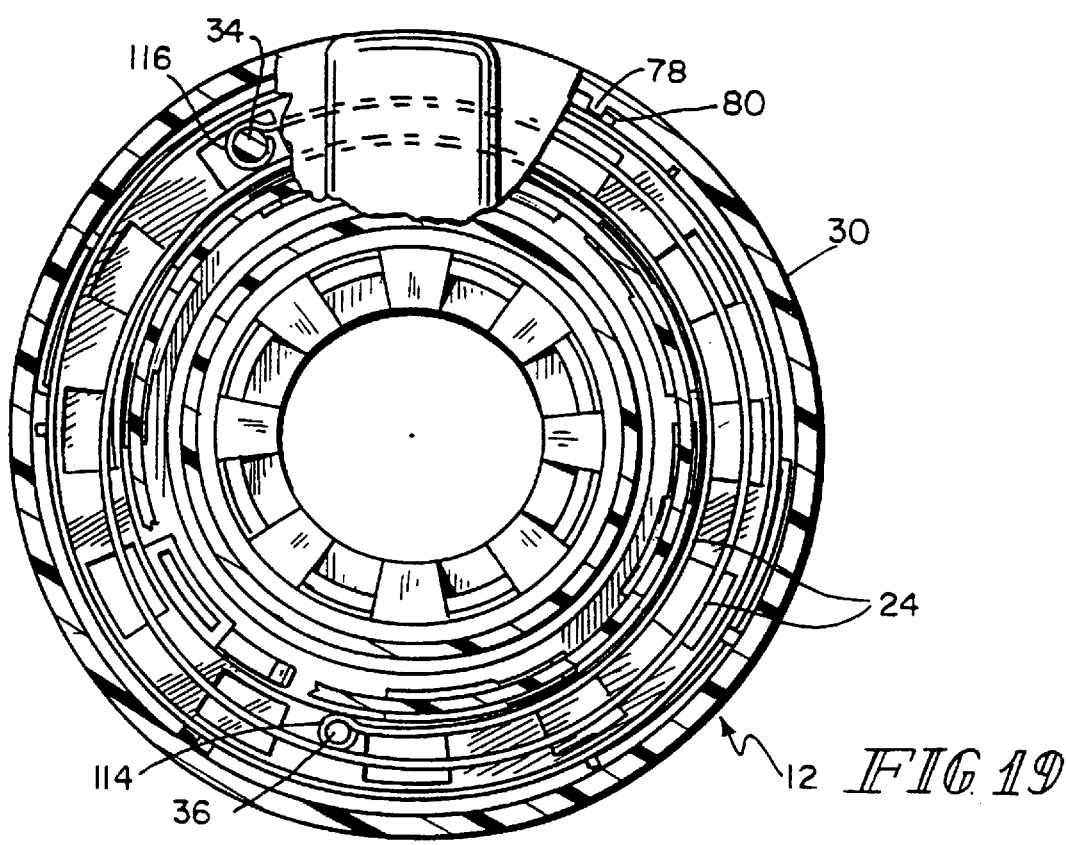
FIG. 19 is a top sectional view taken along line 19—19 of FIG. 18 of the torque-override cap, including a rotary spring connected to the handle and to the torque-transmission ring and in its unwound or unloaded state.

During removal of torque-override cap 10, handle 12 is rotated counterclockwise. As shown best in FIGS. 4 and 19, rotary spring 24 has a first end 38 and a second end 40. Inner shell face 74 includes a cover pin 34 projecting therefrom and a top surface 112 of torque-transmission ring 16 includes a ring pin 36 projecting therefrom.

Rotary spring 24 further includes a pin-receiving coil 114 at first end 38 and a pin-receiving coil 116 at second end 40. Rotary spring 24 is positioned so that pin-receiving coil 116 wraps around cover pin 34 and pin-receiving coil 114 wraps around ring pin 36. In this way, counterclockwise rotation of handle 12 serves to wind, or load, rotary spring 24. This is achieved as cover pin 34 pulls second end 40 of rotary spring 24 in a counterclockwise direction around itself while ring pin 36 holds first end 38 of rotary spring 24 stationary. Rotary spring 24 is wound, or loaded, until rear face 99 of shell rib 78 engages front face 101 of ring projection 80. Once rear face 99 of shell rib 78 engages front face 101 of ring projection 80, handle 12 begins directly to drive torque-transmission ring 16 in a counterclockwise direction with rotary spring 24 wound therebetween.

Figure 20:
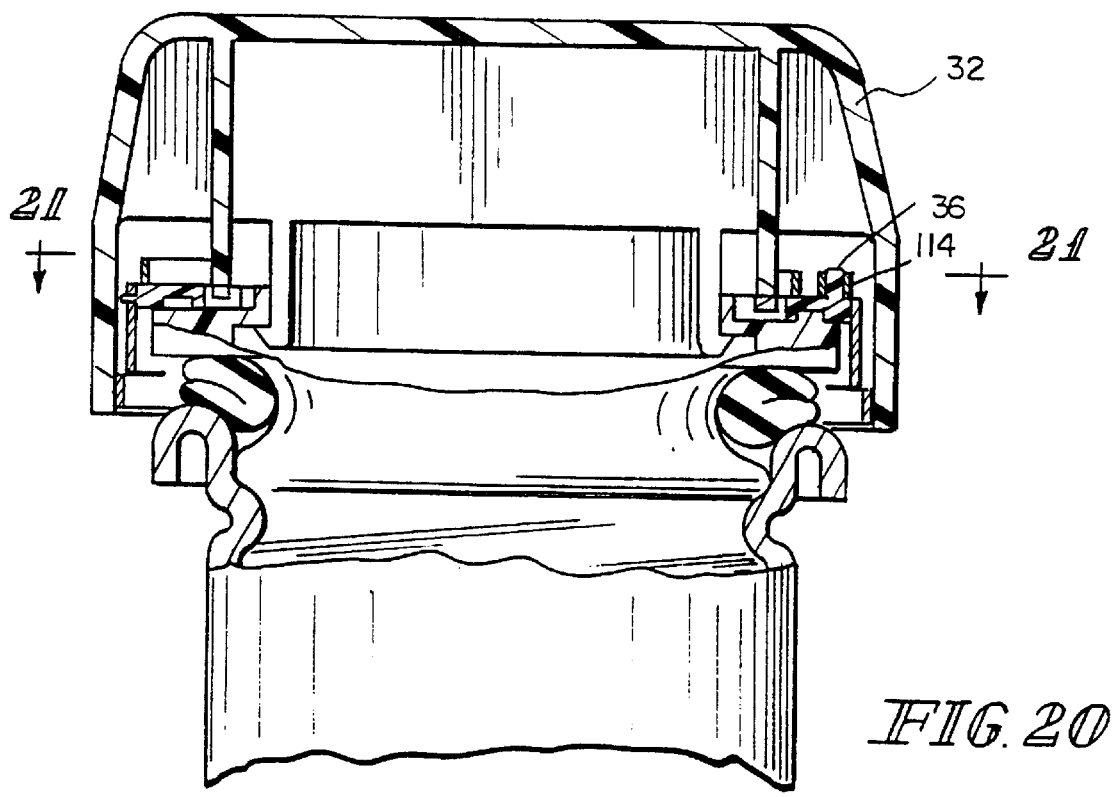
FIG. 20 is a sectional view of the torque-override cap similar to FIG. 18, illustrating the torque-override cap still within the filler neck but with the handle of the torque-override cap having been rotated approximately 90 degrees counterclockwise from the position shown in FIG. 18, but wherein the closure member of the torque-override cap has not rotated within the cap-receiving passageway of the filler neck.
Figure 21:
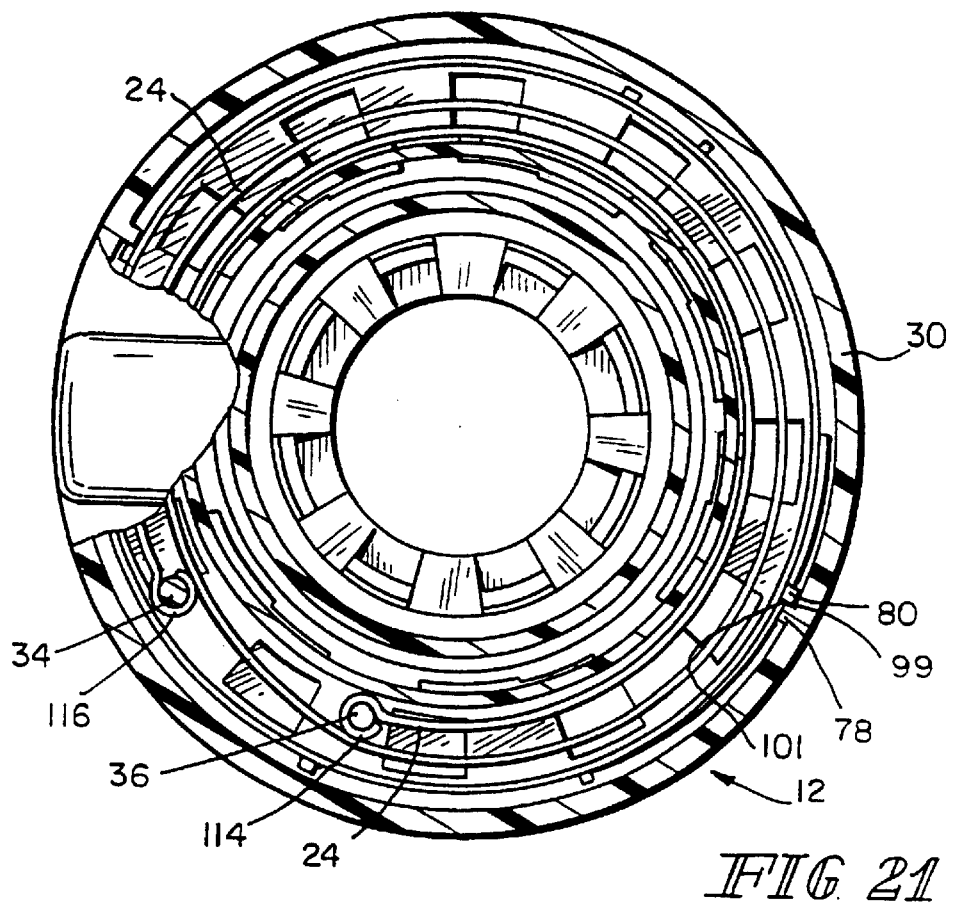
FIG. 21 is a top sectional view taken along line 21—21 of FIG. 20, illustrating a second end of the rotary spring attached to the handle and having moved through 90 degrees counterclockwise with the rotation of the handle illustrated in FIG. 20, thereby winding or loading the rotary spring.

As best shown in FIG. 4, torque-transmission ring 16 includes four ring projections 80. Therefore, handle 12 will wind, or load, rotary spring 24 through its first approximately 90 degrees of counterclockwise rotation. After approximately 90 degrees of counterclockwise rotation, shell rib 78 engages any one of four ring projections 80 and begins driving, and rotating in a counterclockwise direction, torque-transmission ring 16. The number of degrees through which handle 12 may be rotated in a counterclockwise direction before rotating torque-transmission ring 16 may vary, and can be adjusted, depending on the number of ring projections 80 and shell ribs 78. FIGS. 20 and 21 show handle 12 having been rotated counterclockwise approximately 90 degrees, thereby moving second end 40 of rotary spring 24 in a clockwise direction and winding rotary spring 24, as shown in FIG. 21. As can best be seen in FIG. 21, rear face 99 of shell rib 78 is then in direct-drive communication with front face 101 of ring projection 80.

Occasionally, vehicle occupants or service station attendants will "carry" a static electricity charge having an electrical potential that is higher than the vehicle itself. A fuel cap in accordance with the present invention is configured to "ground" a person turning the fuel cap relative to the filler neck so as to dissipate to ground, in a controlled manner, any electrostatic charge or potential on the person during rotation of a cover of the fuel cap relative to a filler neck-engaging base of the fuel cap at the outset of a vehicle refueling cycle and before fuel vapor is allowed to vent through the mouth of the filler neck.

Conductor 204 shown in FIG. 4 includes an annular band or base 215 and fingers 217. Shell ribs 78 formed on handle 12 operate to deflect fingers 217 relative to annular band 215 to contact filler neck 42 so electrical communication is established from handle 12 to filler neck 42 through conductor 204 during rotation of handle 12 relative to closure member 20 and filler neck 42 and before handle 12 turns closure member 20 relative to filler neck 42 to break the seal established between closure member 20 and filler neck 42 as further disclosed in PCT/US98/15518 which is expressly incorporated by reference herein.

As shown in FIG. 4, annular band 215 of conductor 204 includes a ring-shaped axially outer end 220 and an axially inner end 221 formed to include a pair of spaced-apart curved flanges 222. Each finger 217 includes a root 224 appended to one of flanges 222 and a filler neck-contact tip 226 positioned to lie in spaced-apart relation to companion root 224. Each finger 217 also includes a curved body 228 coupled to root 224 and filler neck-contact tip 226. Conductor 204 is made of an electrically conductive, spring material.

Conductor 204 is coupled to torque-transmission ring 16 to rotate therewith relative to closure member 20 and filler neck 42. Axially outer end 220 is formed to include apertures 230 that are arranged to receive mounting posts 232 appended to an annular outer wall 234 of torque-transmission ring 16 so that conductor 204 is mounted in a fixed position on torque-transmission ring 16.

Once torque-transmission ring 16 begins to rotate in a counterclockwise direction, vertical faces 58 of grooves 60 begin pushing against vertical faces 66 of closure lugs 62. This creates direct-drive connection 28, as illustrated in FIG. 3. At this point, torque-transmission ring 16 will be in its base state, as best shown in FIG. 14. As torque-transmission ring 16 begins rotating in a counterclockwise direction (in the opposite direction of arrow 54 of FIG. 14) vertical faces 58 of grooves 60 push against vertical faces 66 of closure lug 62, thereby rotating closure member 20 in a counterclockwise direction. Counterclockwise rotation of closure threads 50 within neck threads 48 serve to back closure member 20 up and out of cap-receiving passageway 46 of filler neck 42. Once closure member 20 is free and clear of filler neck 42, the energy previously stored in the wound rotary spring 24 during the first 90 degrees of counterclockwise rotation of handle 12, releases. In this way, rotary spring 24 unwinds to its base state, thereby rotating closure member 20 approximately 90 degrees clockwise and returning ring projections 80 to their initial state. In other words, front faces 98 of shell rib 78 are repositioned adjacent rear faces 100 of ring projections 80 in preparation for the next insertion of torque-override cap 10 into filler neck 42.

Although the invention has been described in detail with reference to certain preferred embodiments, variations and modifications exist within the scope and spirit of the invention as described and defined in the following claims.

What is claimed is:

1. A torque-override cap for a fuel filler neck comprising
 a handle,
 an axial spring positioned to lie adjacent to the handle,
 a torque-transmission ring coupled to the axial spring and biased away from the handle by the axial spring,
 a rotary spring positioned to lie between the handle and the torque-transmission ring and being movable between wound and unwound positions, the rotary spring being movable from the unwound to the wound position by rotation of the handle relative to the torque-transmission ring, and
 a closure member in communication with the torque-transmission ring, the closure member rotating in response to rotation of the torque-transmission ring.

2. The cap of claim 1, wherein the axial spring includes at least one spring arm.

3. The cap of claim 2, wherein the handle further includes a lip and the axial spring further includes at least one spring head coupled to the spring arm and the spring head is positioned to lie adjacent to the lip.

4. The cap of claim 3, wherein the rotary spring includes a first end and a second end, the first end being coupled to the torque-transmission ring and the second end being coupled to the handle.

5. The cap of claim 4, further comprising a driver positioned to lie between the handle and the torque-transmission ring and a connector positioned to lie between the torque-transmission ring and the closure member.

6. The cap of claim 5, wherein the driver includes a shell rib coupled to the handle and a ring projection coupled to the torque-transmission ring.

7. The cap of claim 6, wherein the connector includes a groove coupled to the torque-transmission ring and a lug coupled to the closure member.

8. The cap of claim 7, wherein the groove has a ramp face and the lug has a ramp face, the ramp face of the groove urging against the ramp face of the lug during installation of the torque-override cap.

9. The cap of claim 8, wherein the groove has a vertical face and the lug has a vertical face, the vertical face of the groove urging against the vertical face of the lug during removal of the torque-override cap.

10. The cap of claim 1, wherein the rotary spring includes a first end and a second end, the first end being coupled to the torque-transmission ring and the second end being coupled to the handle.

11. The cap of claim 1, further comprising a driver positioned to lie between the handle and the torque-transmission ring and a connector positioned to lie between the torque-transmission ring and the closure member.

12. The cap of claim 11, wherein the driver includes a shell rib coupled to the handle and a ring projection coupled to the torque-transmission ring.

13. The cap of claim 12, wherein the connector includes a groove coupled to the torque-transmission ring and a lug coupled to the closure member.

14. The cap of claim 13, wherein the groove has a ramp face and the lug has a ramp face, the ramp face of the groove urging against the ramp face of the lug during installation of the torque-override cap.

15. The cap of claim 14, wherein the groove has a vertical face and the lug has a vertical face, the vertical face of the groove urging against the vertical face of the lug during removal of the torque-override cap.

16. A torque-override cap for a fuel filler neck, the cap comprising a handle rotatable about an axis of rotation, an axial spring positioned to lie adjacent the handle, a torque-transmission ring coupled to the axial spring and biased away from the handle by the axial spring, a driver positioned to lie between the handle and the torque-transmission ring and configured to provide a lost-motion driving connection between the handle and the torque-transmission ring, the driver including a drive member coupled to the handle and a driven member coupled to the torque-transmission ring and positioned to engage the drive member during rotation of the handle about the axis of rotation upon rotation of the handle through a lost-motion angle relative to the torque-transmission ring, and a closure member in communication with the torque-transmission ring, the closure member rotating in response to rotation of the torque-transmission ring.

17. The cap of claim 16, further comprising a connector positioned to lie between the torque-transmission ring and the closure member, the connector including drive ramps coupled to the torque-transmission ring and driven teeth coupled to the closure member and arranged to engage the drive ramps to provide a torque-limited connection in a cap-advancing direction and a direct-drive connection in a cap-removal direction, and wherein the axial spring is arranged to yieldably urge the torque-transmission ring in a direction toward the closure member during rotation of the handle and the torque-transmission ring about the axis of rotation with and relative to the closure member to maintain the torque-limited connection.

18. The cap of claim 16, wherein the axial spring includes at least one spring arm integrally coupled to the torque-transmission ring.

19. The cap of claim 18, wherein the torque-transmission ring includes a circular inner edge and each spring arm includes a base end integrally coupled to the circular inner edge and a head that is arranged to contact an underside of the handle.

20. The cap of claim 19, wherein each spring arm further includes an arm member cantilevered to the base end to support the head for movement relative to the torque-transmission ring and arranged to lie in spaced-apart relation to the circular inner edge in an interior region bounded by the circular inner edge.

21. The cap of claim 16, wherein the axial spring includes a plurality of spring arms, each spring arm is coupled at one end to the torque-transmission ring and provided with a spring head at an opposite end that is arranged to maintain contact with an underside of handle during rotation of the handle about the axis of rotation.

22. The cap of claim 21, wherein the torque-transmission ring includes a circular inner edge and the spring arms are coupled to the circular inner edge and arranged to lie in circumferentially spaced-apart relation to one another about the circular inner edge.

23. The cap of claim 21, wherein the handle includes a top wall, a circular side wall depending from the top wall to surround the torque-transmission ring, and an annular foundation depending from the top wall to lie within a region defined by the circular side wall and engaging the spring heads during rotation of the handle about the axis of rotation.

24. The cap of claim 16, wherein the handle includes a top wall and a circular side wall depending from the top wall to surround the torque-transmission ring, the drive member is coupled to the circular side wall, the torque-transmission ring includes a circular outer edge, and the driven member is coupled to the circular outer edge.

25. The cap of claim 24, wherein the torque-transmission ring includes a circular inner edge and the axial spring is coupled to the circular inner edge.

26. The cap of claim 25, wherein the axial spring includes a plurality of spring arms coupled to the circular inner edge and arranged to lie in circumferentially spaced-apart relation to one another about the circular inner edge.

27. The cap of claim 16, further comprising a rotary spring positioned to lie between the handle and the torque-transmission ring and coupled to the handle and to the torque-transmission ring to move from an unwound position to a wound position during rotation of the handle relative to the torque-transmission ring through the lost-motion angle.

28. The cap of claim 27, wherein the rotary spring includes a spiral member having a first end coupled to the handle and a second end coupled to the torque-transmission ring.

29. The cap of claim 28, wherein the handle includes a top wall and a side wall depending from the top wall to surround the torque-transmission ring, the torque-transmission ring includes an annular deck lying below and facing toward the top wall, the first end of the spiral member is coupled to a first pin depending from the top wall of the handle, and the second end of the spiral member is coupled to a second pin appended to the annular deck of the torque-transmission ring.

30. A cap engageable with a filler neck having a mouth, the cap comprising a closure member adapted to close the filler neck, a handle, a torque-transmission ring positioned to lie between the handle and the closure member and coupled to each of the handle and the closure member to cause the closure member to rotate about an axis of rotation in response to rotation of the handle about the axis, the torque-transmission ring including a deck, an inner edge, and an outer edge, the inner and outer edges extending downwardly from the deck, and a rotary spring coupled to the handle and to the torque-transmission ring to turn the closure member and the torque-transmission ring as a unit about the axis of rotation each time the closure member is removed from a filler neck to reset the closure member automatically to a predetermined position relative to the handle about the axis of rotation, the rotary spring including first and second ends and a body extending therebetween, the body of the rotary spring being positioned to lie between the inner and outer edges of the torque transmission ring.

31. The cap of claim 30, wherein the rotary spring is a helical clock spring made of a strip of spring metal.

32. The cap of claim 31, wherein the handle includes a top wall and an annular side wall depending from the top wall, the first end of the rotary spring is coupled to the top wall of the handle, and the second end of the rotary spring is coupled to the torque-transmission ring.

33. The cap of claim 31, wherein the handle includes a top wall and an annular side wall depending from the top wall, the deck of the torque-transmission ring is annularly-shaped and positioned to lie below and facing toward the top wall, the inner and outer edges of the torque-transmission ring cooperate to define the annular shape of the deck, and the rotary spring has a first end coupled to a first pin depending from the top wall of the handle and a second end coupled to a second pin appended to the deck of the torque-transmission ring.

34. The cap of claim 30, wherein the inner edge of the torque-transmission ring defines a central aperture, the handle includes a top wall, an annular side wall depending from the top wall, and an annular insert depending from the top wall of the handle and extending into the central aperture formed in the torque-transmission ring, and the rotary spring is positioned to lie in an annular space between the annular insert and the surrounding annular side wall of the handle.

35. The cap of claim 34, wherein the inner edge is circular and the handle includes a top wall, an annular side wall depending from the top wall, and a foundation wall depending from the top wall and surrounding the annular insert and further comprising at least one spring arm coupled to the circular inner edge and arranged to contact the foundation wall to yieldably urge the torque-transmission ring in a direction toward the closure member during rotation of the handle and the torque-transmission ring about the axis of rotation with and relative to the closure member.

36. The cap of claim 30, wherein the first and second ends of the rotary spring are arranged to lie in a first plane.

37. The cap of claim 30, wherein the handle includes a top wall and an annular side wall depending from the top wall and the first and second ends of the rotary spring are arranged to lie a first distance below the top wall of the handle.

38. The cap of claim 30, wherein the body of the rotary spring abuts the deck of the torque-transmission ring.

39. The cap of claim 38, wherein the deck of the torque-transmission ring is horizontally planar and the body of the rotary spring is positioned to lie above the deck and abuts the deck along the length of the body.

40. The cap of claim 30, wherein the inner edge of the torque-transmission ring defines a central aperture and the entire rotary spring is positioned to lie spaced apart from the central aperture.

* * * * *